United States Patent [19]
Fournis

[11] 3,731,148
[45] May 1, 1973

[54] HIGH-SENSITIVITY DIFFERENTIAL RELAY PROTECTED AGAINST DISTURBANCES

[75] Inventor: Jean-Francois Fournis, Grenoble, France

[73] Assignee: Societe D'Appareillage Electrique Saparel, Saint-Marcellin, France

[22] Filed: Mar. 15, 1971

[21] Appl. No.: 124,639

[30] Foreign Application Priority Data

Mar. 13, 1970 France..................................7009178

[52] U.S. Cl. ...............................317/18 D, 317/27 R
[51] Int. Cl................................................H02h 1/02
[58] Field of Search ..........................317/18 D, 27 R

[56] References Cited

UNITED STATES PATENTS

| 3,525,018 | 8/1970 | Murphy et al. | 317/27 R |
|---|---|---|---|
| 3,555,359 | 1/1971 | Trumbull et al. | 317/18 D |

Primary Examiner—L. T. Hix
Attorney—Craig, Antonelli, Stewart & Hill

[57] ABSTRACT

A differential relay comprising a homopolar transformer and a parallel electromechanical relay having low power consumption comprising an amplifier disposed between the output of the homopolar transformer and the electromechanical relay and characterized in that the aforementioned amplifier comprises essentially a differential amplifier, one of the inputs of which receives the output voltage of said transformer.

6 Claims, 1 Drawing Figure

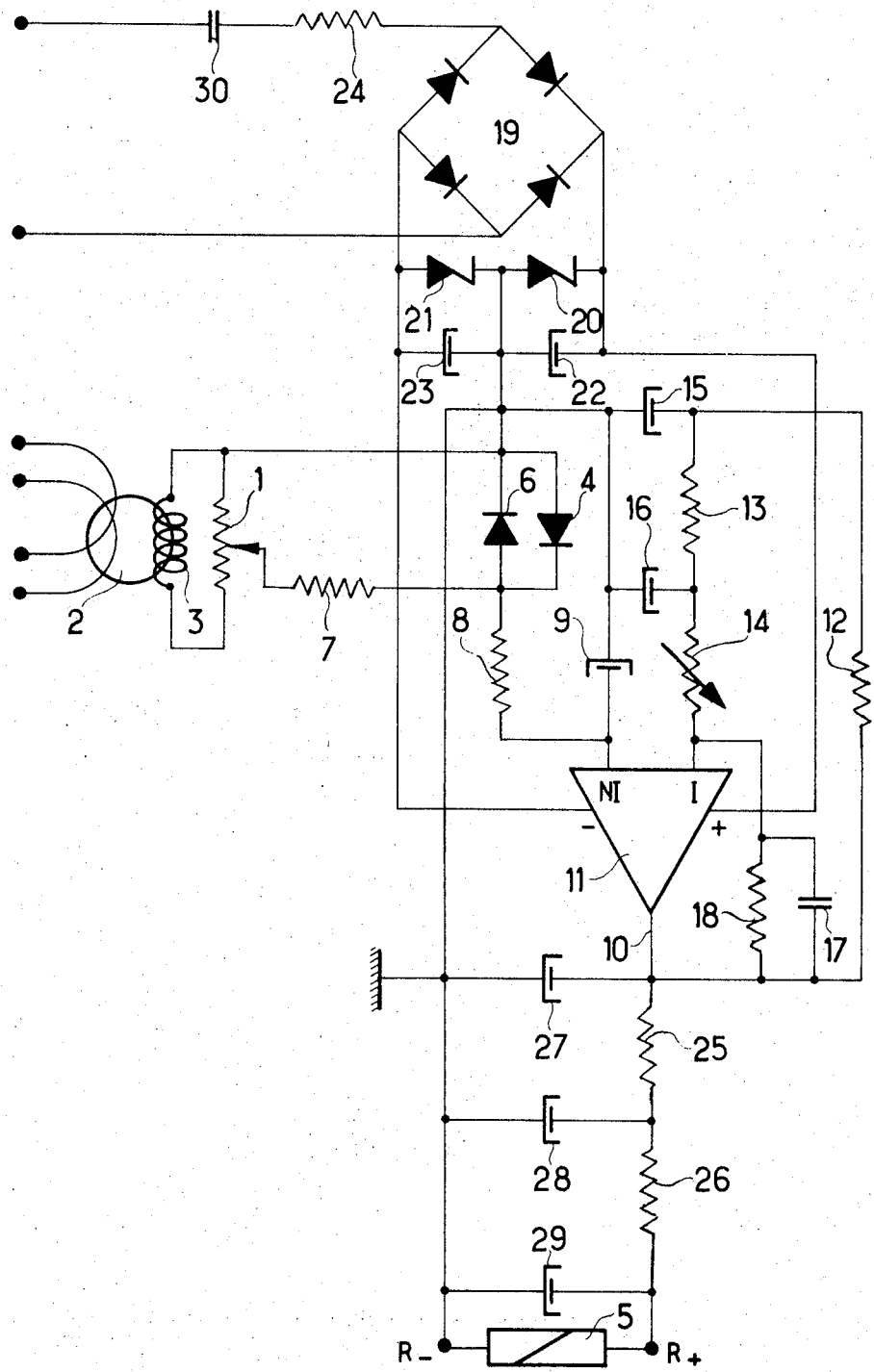

HIGH-SENSITIVITY DIFFERENTIAL RELAY PROTECTED AGAINST DISTURBANCES

The present invention relates to differential relays, i.e., to devices designed for the protection of an electric line against defects in insulation with respect to ground.

Differential relays generally comprise a current transformer, most often a toric transformer which is traversed by all of the neutral phase conductors of the line and whose secondary energizes or supplies an electromechanical measuring relay that controls a cut-off apparatus. In order to assure effective protection against electrocution due to either direct or indirect contact with an active conductor, it is necessary that the differential relay operate for a breakdown current whose intensity is in the order of from 20 to 30 milliamperes. However, unless a current transformer with prohibitive dimensions is used, it is not possible to obtain such a sensitivity with a differential relay composed solely of a current transformer whose secondary discharges into the coil of an electromechanical measuring relay. For this reason, it has been conceived to insert between the secondary of the current transformer and the coil of the measuring relay, an electronic amplifier whose supply or energization is sampled on the line to be supervised upstream of the differential relay.

It has been possible to thus construct differential relays operating effectively for a breakdown current whose intensity is in the order of from 15 to 30 milliamperes. But the latter have been found to be unusable in actual practice, for they become disconnected or released at the slightest disturbance or interference caused, for example, by the switching operation or commutation of electric machines on the line to be supervised.

The present invention is directed to and concerned with a differential relay using a current transformer having small dimensions, which should have a great insensitivity to disturbances, a very low release threshold, and a short response time.

According to one characteristic of the present invention, the differential relay comprises a differential amplifier connected between a current transformer and a measuring relay, one input of which is connected to the secondary of the current transformer and whose output controls the measuring relay.

According to another feature of the present invention, the aforementioned differential amplifier is energized by the line to be supervised by means of a capacitor and a resistor disposed in series with a rectifier bridge which applies its output through two Zener diodes which are connected in series.

According to yet another characteristic of the present invention, the secondary of the current transformer is connected to one input of the aforementioned differential amplifier by means of a corrective circuit or network operating with a leading phase characteristic.

According to still another characteristic of the present invention, the pass-band of the aforementioned differential amplifier is limited by means of two negative feedback loops, one of these loops comprising a low-pass filter assuring the rejection of the direct current component of the signal and the other loop comprising a high-pass filter assuring the rejection of high frequency components of the signal.

In accordance with yet another characteristic of the present invention, the output of the differential amplifier is connected to the measuring relay by means of a low-pass filter.

Other characteristics and advantages of the present invention will become readily apparent from the following detailed description when taken in conjunction with the accompanying drawing of one embodiment of the present invention which has been given solely by way of example and is therefore not to be construed as limiting in any way.

The drawing consists of a single FIGURE which represents a schematic electrical diagram of one embodiment of the present invention. A toric current transformer 2 is traversed by all of the neutral phase conductors of the electrical line to be supervised. Two primary lines are illustrated on the transformer 2 in the FIGURE. The secondary 3 thereof is connected across a regulating potentiometer 1, one end of which is connected to ground. The non-inverting input NI of a differential amplifier 11 is connected to the movable tap of the regulating potentiometer 1 via protecting resistances 7 and 8 and to ground through the resistance 8 in series with a peak or amplitude limiter circuit formed by inversely connected diodes 4 and 6. A corrective circuit or network having a leading phase characteristic formed by the series resistance 8 and the parallel capacitance 9 is also connected to input NI of amplifier 11.

The pass-band of the differential amplifier 11 is limited by means of two negative feedback loops connected between the output 10 and the inverting input I of the differential amplifier 11. The first of these comprises a low-pass filter in the form of an RC filter comprising the series resistances 12, 13 and 14, and the parallel capacitances 15 and 16. This feedback loop assures the total rejection of the direct current component of the signal. The second of these feedback loops comprises a high-pass filter formed by a resistance 18 and a capacitance 17 connected in parallel. This feedback loop assures the rejection of the high frequency components of the signal.

The amplifier 11 is energized from a supply network by means of a rectifier bridge 19 across the direct-current side of which are connected two stabilizing Zener diodes 20 and 21 connected in series. Capacitors 22 and 23 are connected in parallel with the Zener diodes 20 and 21, respectively. The capacitors 22 and 23 have preferably different capacities. This makes it possible to obtain release of the differential relay in the case where the energization or supply of the amplifier disappears.

A resistance 24 and a capacitance 30 are connected in series with the rectifier bridge 19 on the alternating current side. The values of these elements are chosen in a manner such as to allow for the energization or supply of the differential amplifier 11 from networks of different voltages without commutation and with a small energy dissipation.

The output 10 of the differential amplifier 11 is connected to the coil 5 of the measuring relay by means of a low-pass filter which is an RC filter formed by the series resistances 25 and 26 and the parallel capacitances 27, 28 and 29.

In view of the presence of the correcting device providing a leading phase characteristic for the negative feedback loops and the low-pass filter connected at the output of the amplifier 11, the pass-band of this differential relay is very narrow. In a case where the electrical line to be supervised is a network operating at 50 Hz, the different elements of the filters are calculated so that a pass-band with 3 db for the system is centered on approximately 25 Hz and so that its length is in the order of 60 Hz. Outside of this band, the attenuation caused by the different filters is considerable, which has the result that the industrial disturbances whose frequency is clearly superior to about a hundred Hertz are without influence upon the relay, whereas a breakdown current whose frequency is that of the network, even at very low intensity, can effect a release through energization of winding 5.

In the case of the use of a polarized electromechanical relay as the measuring relay, one may reduce the response time or period of the differential relay by interposing a rectifier bridge before the coil 5 of the measuring relay.

The differential amplifier 11 is advantageously an operational amplifier realized in the form of an integrated circuit. In that case, it will comprise moreover its own frequency correction circuits.

It is particularly recommended that the differential relay proposed by the present invention be used in the systems designed for protection against the risks of electrocution due to either direct or indirect contact with an active conductor.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A high-sensitivity differential relay comprising a current transformer having a primary winding and a secondary winding, an electromechanical measuring relay, and an electronic amplifier energized by a power line to be supervised and having its output connected in control of said measuring relay, characterized in that said amplifier is a differential amplifier, one input of which is connected to said secondary winding of said current transformer, the primary winding of said transformer being connected to the neutral conductor of said power line wherein the pass-band of the differential amplifier is limited by means of two negative feedback loops each connected between the output of said amplifier and the other input thereof, one feedback loop comprising a second low-pass filter for blocking low frequency components of the amplifier signal, the other feedback loop comprising a high-pass filter for blocking high frequency components of the amplifier signal.

2. A high-sensitivity differential relay according to claim 1, wherein said negative feedback loops are connected between the output of the differential amplifier and the inverting input thereof; said second low-pass filter being an RC filter comprising series resistances and parallel capacitances, and said high-pass filter being an RC filter comprising one capacitance and one parallel resistance.

3. A high sensitivity differential relay comprising a current transformer having primary windings and a secondary winding, each of said primary windings being connected in series with a different conductor of a power line to be supervised, an electromechanical measuring relay including an operative coil, an electronic differential amplifier having its inverting input connected to its output by means of first and second feedback loops limiting its pass-band, one loop including a low-pass filter comprising a plurality of series resistances and parallel capacitances and the other loop including a high-pass filter comprising one series capacitance and one parallel resistance, means connecting said secondary winding of said current transformer to the non-inverting input of said differential amplifier, means connecting said operative coil of said measuring relay to the output of said differential amplifier, and supply means for energizing said differential amplifier through said power line to be supervised.

4. The high sensitivity differential relay of claim 3 wherein said means connecting said operative coil of said measuring relay to the output of said differential amplifier is a low-pass filter comprising a plurality of series resistances and parallel capacitances.

5. The high sensitivity differential relay of claim 3 wherein said means connecting said secondary winding of said current transformer to the non-inverting input of said differential amplifier is a correcting circuit having a leading phase characteristic comprising a series resistance and a parallel capacitance.

6. The high sensitivity differential relay of claim 3 wherein said supply means comprises a capacitance and a resistance connected in series with a rectifier bridge to said power line, a pair of Zener diodes connected in series across the output of said rectifier bridge, each of said Zener diodes having a capacitance connected in parallel having different capacities to obtain release of the differential relay in the case where the supply of said differential amplifier disappears.

* * * * *